US010802834B2

(12) United States Patent
Kumar et al.

(10) Patent No.: US 10,802,834 B2
(45) Date of Patent: Oct. 13, 2020

(54) ENABLING MULTIPLE SECURE BOOT PATHS ON A HARDWARE PLATFORM

(71) Applicant: Google LLC, Mountain View, CA (US)

(72) Inventors: Puneet Kumar, Saratoga, CA (US);
Mark Hayter, Menlo Park, CA (US);
Willis Calkins, Sunnyvale, CA (US);
Duncan Laurie, Santa Cruz, CA (US)

(73) Assignee: GOOGLE LLC, Mountain View, CA (US)

(*) Notice: Subject to any disclaimer, the term of this patent is extended or adjusted under 35 U.S.C. 154(b) by 222 days.

(21) Appl. No.: 16/004,586

(22) Filed: Jun. 11, 2018

(65) Prior Publication Data

US 2019/0377583 A1    Dec. 12, 2019

(51) Int. Cl.
*G06F 9/4401* (2018.01)
(52) U.S. Cl.
CPC .................... *G06F 9/441* (2013.01)
(58) Field of Classification Search
CPC ...................................... G06F 9/441
USPC ......................................... 713/170
See application file for complete search history.

(56) References Cited

U.S. PATENT DOCUMENTS

| | | | |
|---|---|---|---|
| 8,510,543 B1 | 8/2013 | Shankar et al. | |
| 9,300,467 B2* | 3/2016 | Viswanathan | ...... H04L 12/4625 |
| 9,785,801 B2 | 10/2017 | Zimmer et al. | |
| 2010/0169949 A1* | 7/2010 | Rothman | ................ G06F 21/35 |
| | | | 726/1 |
| 2011/0119474 A1 | 5/2011 | Singh et al. | |
| 2013/0297924 A1 | 11/2013 | Laue et al. | |
| 2015/0347152 A1 | 12/2015 | Pinder | |
| 2017/0147455 A1 | 5/2017 | Sakuma | |

(Continued)

FOREIGN PATENT DOCUMENTS

| | | |
|---|---|---|
| CN | 102200933 A | 9/2011 |
| CN | 104360867 A | 2/2015 |
| CN | 106990958 A | 7/2017 |

OTHER PUBLICATIONS

International Search Report and Written Opinion for PCT Application No. PCTUS2019035557 dated Aug. 30, 2019.

(Continued)

*Primary Examiner* — Jacob Lipman
(74) *Attorney, Agent, or Firm* — Botos Churchill IP Law LLP

(57) ABSTRACT

A computing system is configured to securely boot different operating systems. The computing system includes one or more processors, a first memory device storing a first firmware element for booting a first operating system, a second memory device storing a second firmware element for booting a second operating system, a first security module configured to provide authentication for booting the first operating system, and a second security module configured to provide authentication for booting the second operating system. The computing system is configured such that, when the first security module is connected to the one or more processors, either the first operating system or the second operating system is selected for booting based on a selection signal, and when the first security module is not connected to the one or more processors, the second operating system is selected for booting.

16 Claims, 8 Drawing Sheets

(56) References Cited

U.S. PATENT DOCUMENTS

2018/0025183 A1 1/2018 Zimmer et al.
2018/0365426 A1* 12/2018 Callaghan ........... G06F 21/6218

OTHER PUBLICATIONS

Sinha, Sushovon, Secure Boot in Windows 8.1, Microsoft Comm., Oct. 30, 2016, pp. 1-23, retrv'd from Internet: URL:https://answers.microsoft.com/en-us/windows/forum/windows8_1-security/uefi-secure-boot-in-windows-81/65d74e19-9572-4a91-85aa-57fa783f0759 [retr'vd Apr. 18, 2018].

Tomlinson, Allan, "Chapter 7, Introduction to the TPM", 18 pgs. (2008).

Sun, Jiming, et al., Apress Open, "Embedded Firmware Solutions" Development Best Practices for the Internert of Things, 135 pages (Part 1 of 2) (2015).

Sun, Jiming, et al., Apress Open, "Embedded Firmware Solutions" Development Best Practices for the Internert of Things, 80 pages (Part 2 of 2) (2015).

* cited by examiner

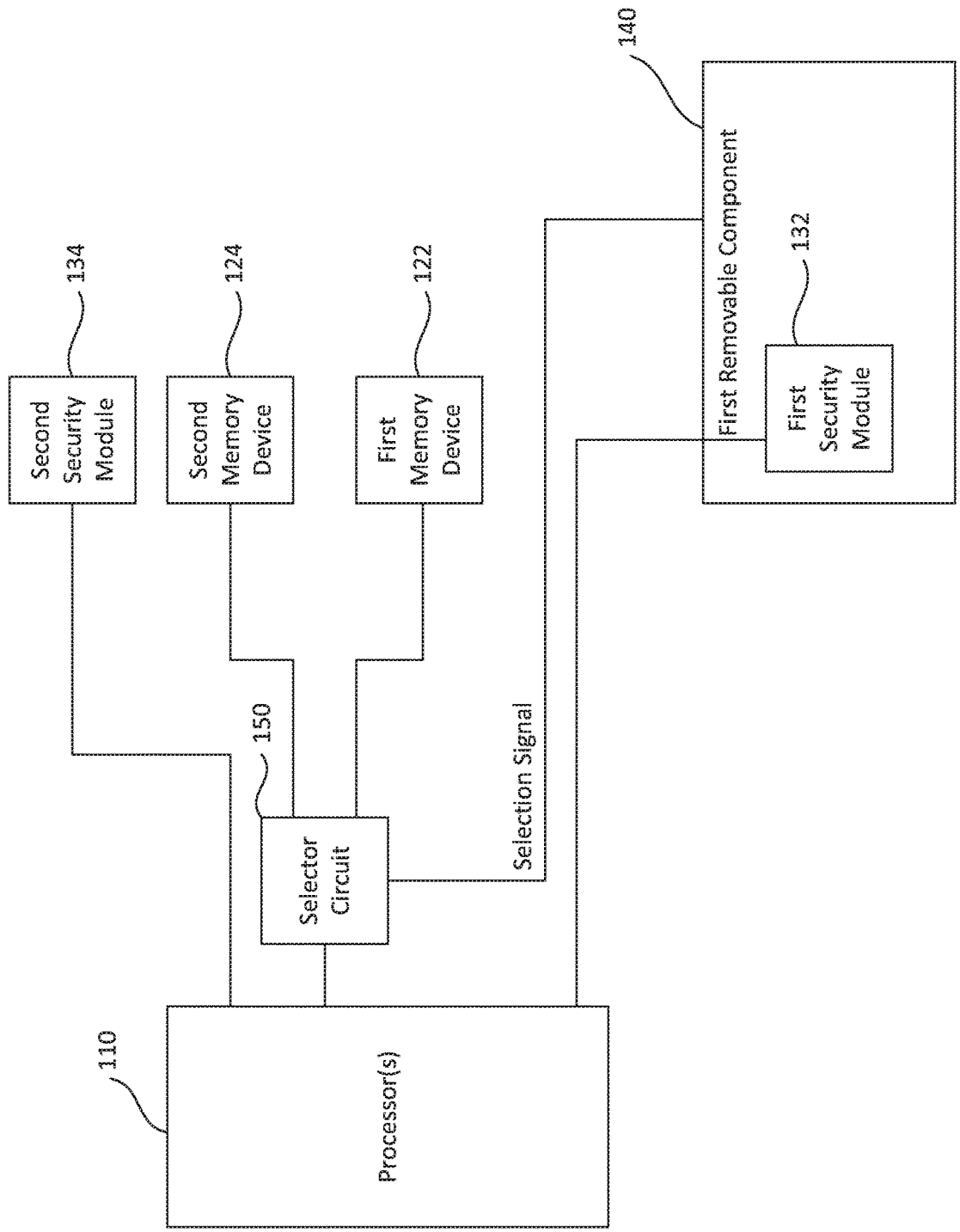

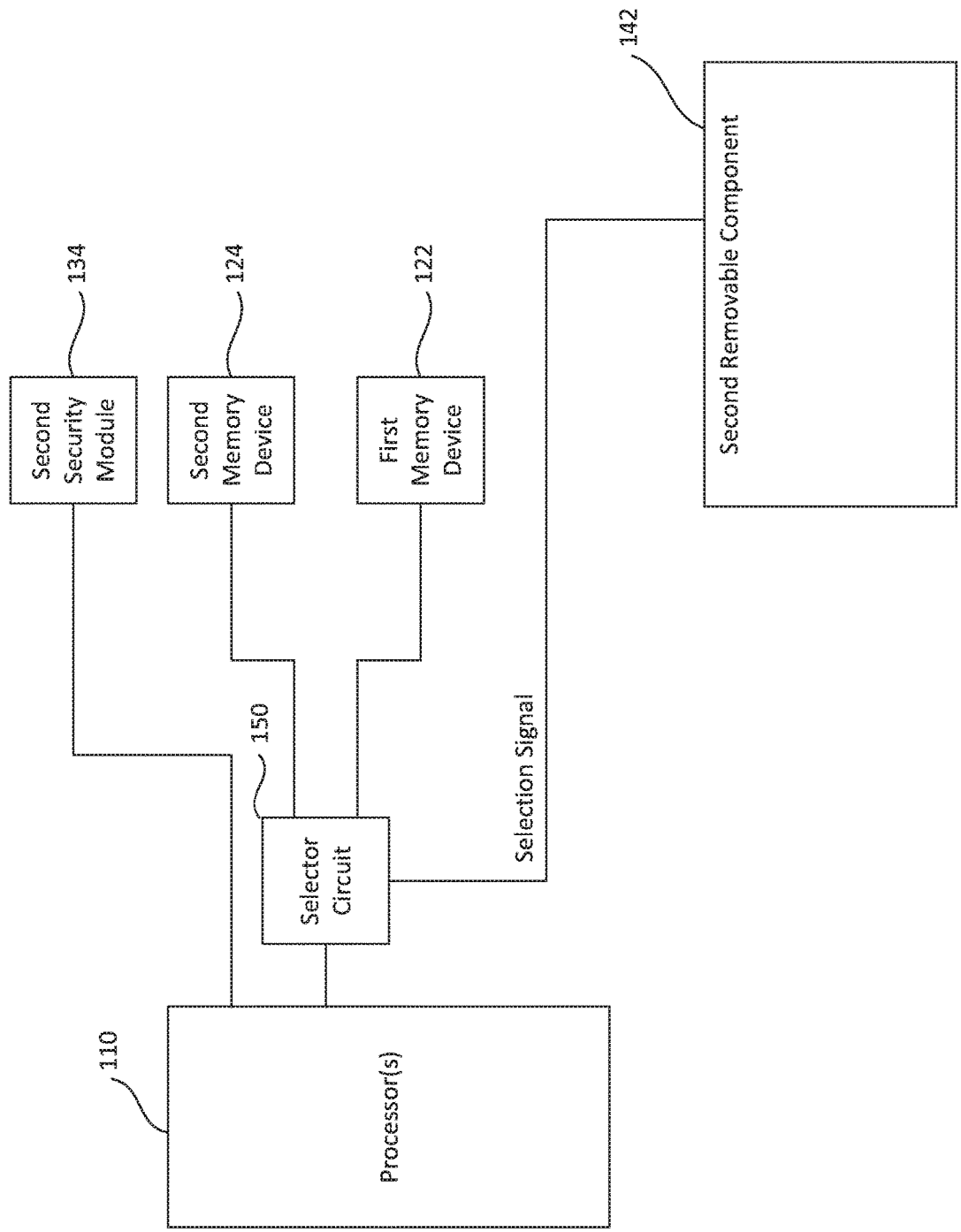

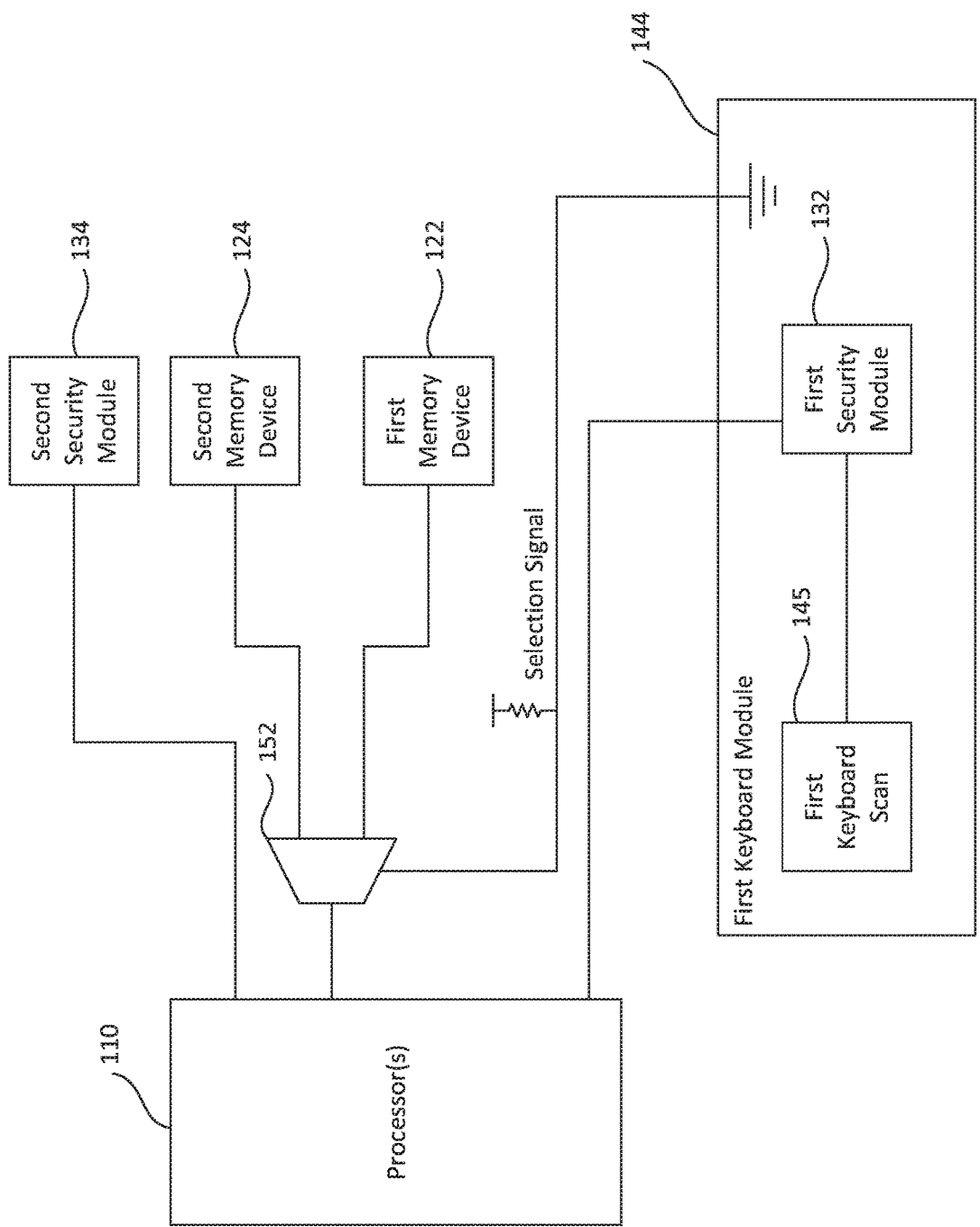

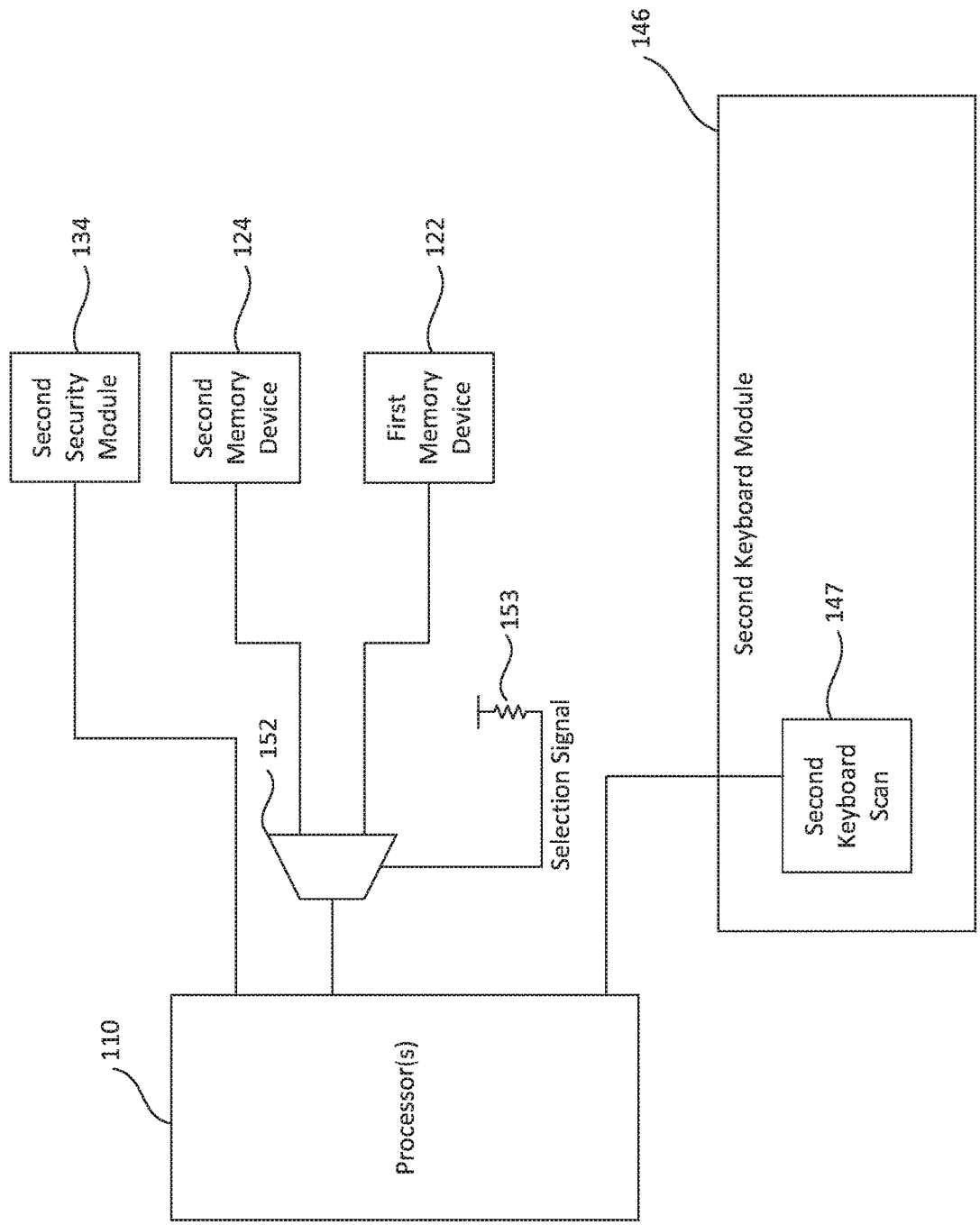

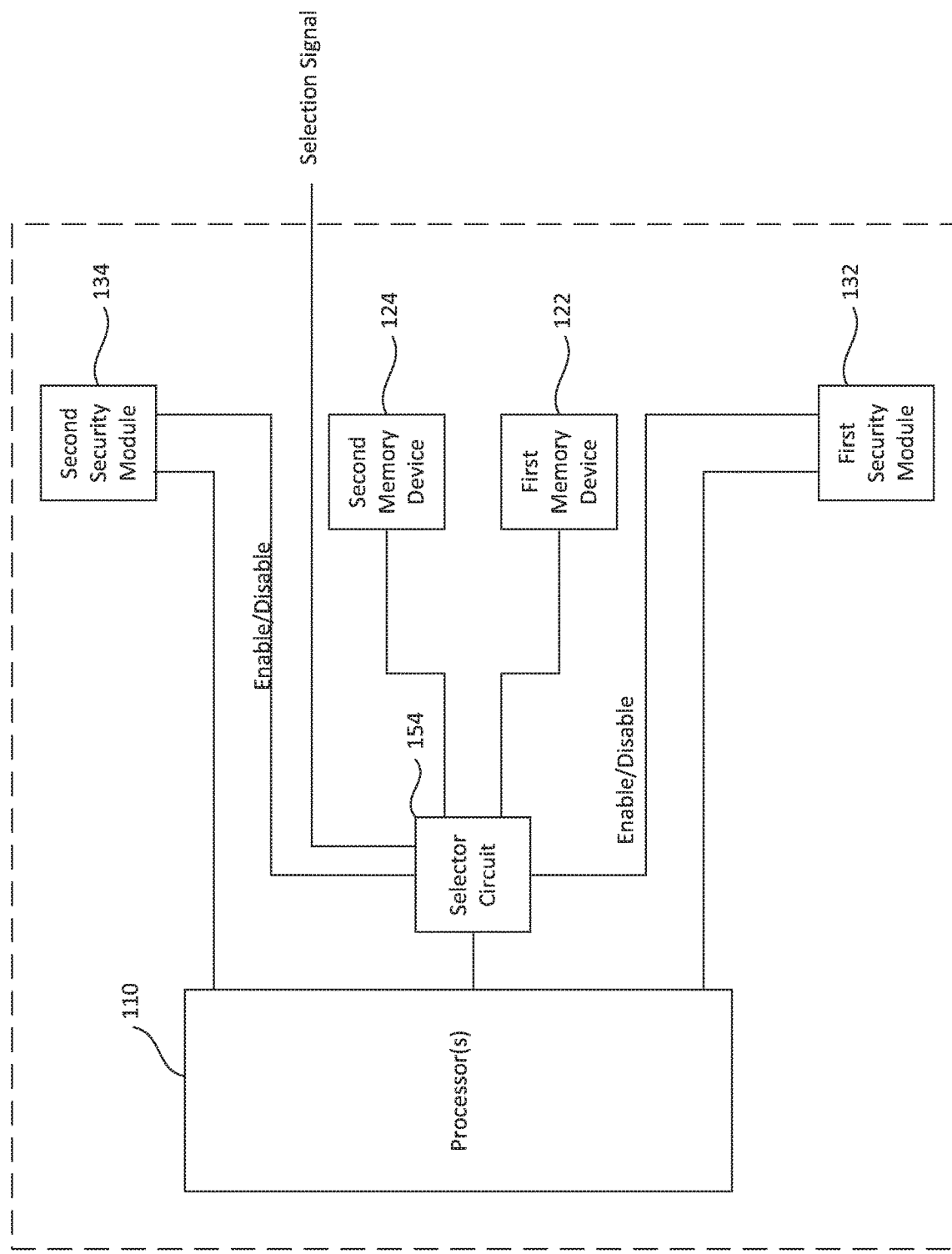

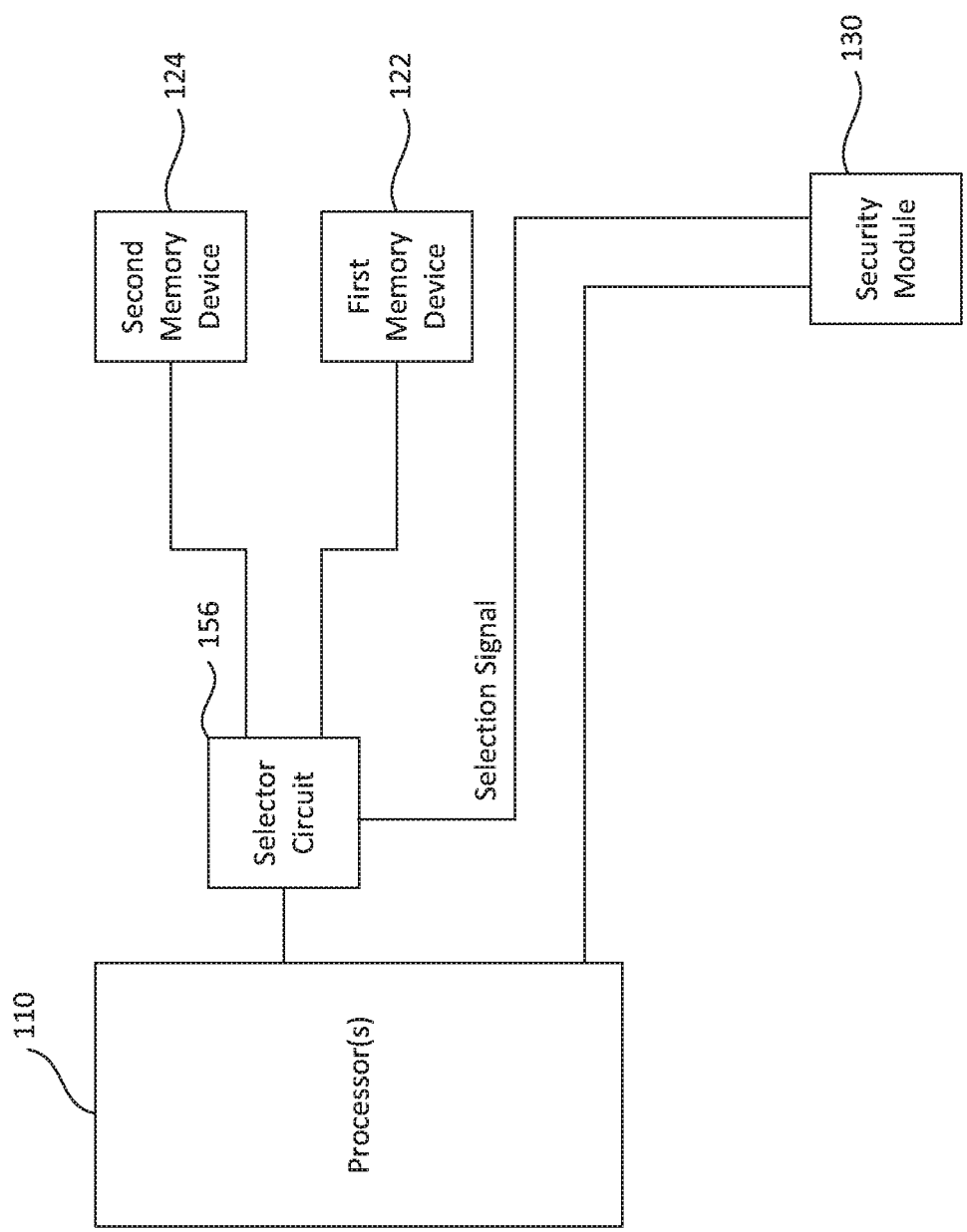

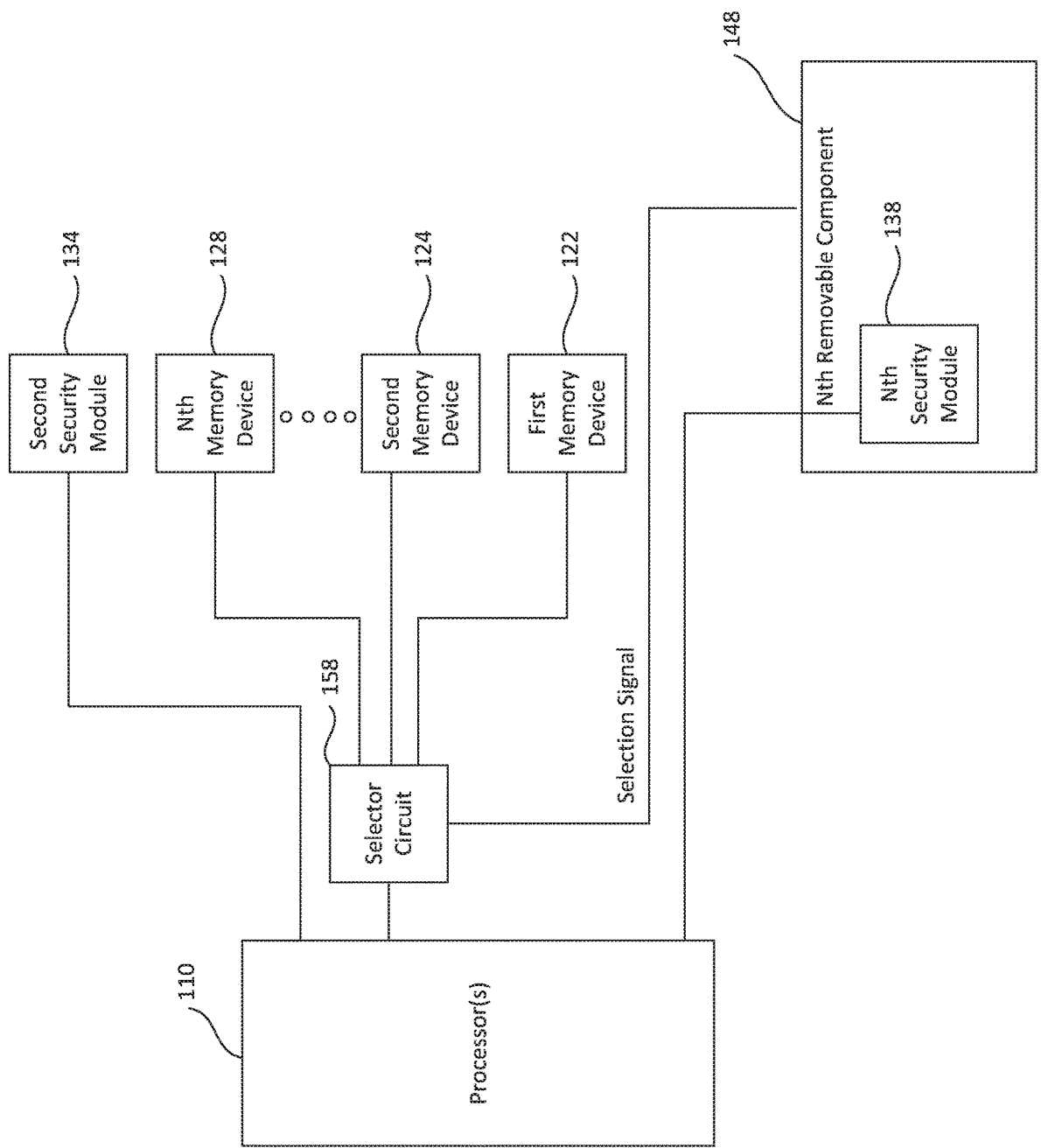

ENABLING MULTIPLE SECURE BOOT PATHS ON A HARDWARE PLATFORM

BACKGROUND

Firmware is software that provides instructions to a computing device's specific hardware, such as instructions to boot an operating system. A computing device may be configured to boot multiple operating systems. For example, a conventional computing device may have one firmware element configured to boot multiple operating systems. Or, alternatively, the computing device may have one firmware element that runs another firmware element as a payload. However, in such cases, there is no guarantee that all features of each operating system are fully supported. Further, the computing device may not be equipped with the necessary security authentication for each of the operating systems.

BRIEF SUMMARY

The present disclosure provides for a computing system comprising a first memory device operatively connected to the one or more processors, the first memory device storing a first firmware element for booting a first operating system; a second memory device operatively connected to the one or more processors, the second memory device storing a second firmware element for booting a second operating system; a first security module configured to provide authentication for booting the first operating system; and a second security module operatively connected to the one or more processors, the second security module configured to provide authentication for booting the second operating system; wherein when the first security module is operatively connected to the one or more processors, the one or more processors are configured to select either the first operating system or the second operating system to boot in response to a selection signal, and when the first security module is not operatively connected to the one or more processors, the one or more processors are configure to boot the second operating system.

The computing system may further comprise a selector circuit operatively connected to the one or more processors, the first memory device, and the second memory device, wherein the selector circuit is configured to operatively connect one of the first memory device or the second memory device to the one or more processors based on the selection signal. The selection signal may be based on whether the first security module is operatively connected to the one or more processors. The selector circuit may be configured to enable or disable the first security module based on the selection signal.

The computing system may further comprise a removable peripheral component removably connected to the one or more processors, wherein the first security module is mounted in the removable peripheral component. The removable peripheral component may include one or more features identifiable with the first operating system. The removable peripheral component may be a keyboard module. The keyboard module may include one or more features identifiable with the first operating system. The one or more identifiable features may include a layout of keys on the keyboard module. The removable peripheral component may be a circuit board. The computing system may further comprise a selector circuit operatively connected to the one or more processors, the first memory device, the second memory device, and the removable peripheral component, wherein the selector circuit is configured to operatively connect the first memory device to the one or more processors when the removable peripheral component is operatively connected to the selector circuit.

The one or more processors may comprise at least one of a central processing unit or an embedded controller.

At least one of the first memory device or the second memory device may be a serial peripheral interface (SPI).

One of the first firmware element or the second firmware element may be one of a coreboot firmware element, a Universal Extensible Firmware Interface (UEFI), or a Basic Input/Output System (BIOS).

At least one of the first security module or the second security module may be a Trusted Platform Module (TPM).

The disclosure further provides for a computing system comprising one or more processors; a first memory device operatively connected to the one or more processors, the first memory device storing a first firmware element for booting a first operating system; a second memory device operatively connected to the one or more processors, the second memory device storing a second firmware element for booting a second operating system; and one of either a first security module configured to provide authentication for booting the first operating system, or a second security module configured to provide authentication for booting the second operating system; wherein the one or more processors are configured to select either the first operating system or the second operating system to boot in response to whether the first security module or the second security module is operatively connected to the one or more processor.

The computing system may further comprise a selector circuit operatively connected to the one or more processors, the first memory device, and the second memory device, wherein the selector circuit is configured to operatively connect either the first memory device or the second memory to the one or more processors based on whether the first security module or the second security module is operatively connected to the one or more processor. The selection signal may be part of a signal received from one of a switch, a jumper, or another chip. The selection signal may be part of a signal received from a user.

The disclosure further provides for determining whether multiple firmware elements are provided in a computing system for booting different operating systems on the computing system, detecting whether a particular security module is available in the computing system, and selecting, in response to the detection of the particular security module, one of the firmware elements for booting one of the different operating systems.

BRIEF DESCRIPTION OF THE DRAWINGS

FIG. 1A illustrates an example system in accordance with aspects of the disclosure.

FIG. 1B illustrates an example system in accordance with aspects of the disclosure.

FIG. 2A illustrates an example system in accordance with aspects of the disclosure.

FIG. 2B illustrates an example system in accordance with aspects of the disclosure.

FIG. 3 illustrates an example system in accordance with aspects of the disclosure.

FIG. 4 illustrates an example system in accordance with aspects of the disclosure.

FIG. 5 illustrates an example system in accordance with aspects of the disclosure.

DETAILED DESCRIPTION

Overview

Figure 6:
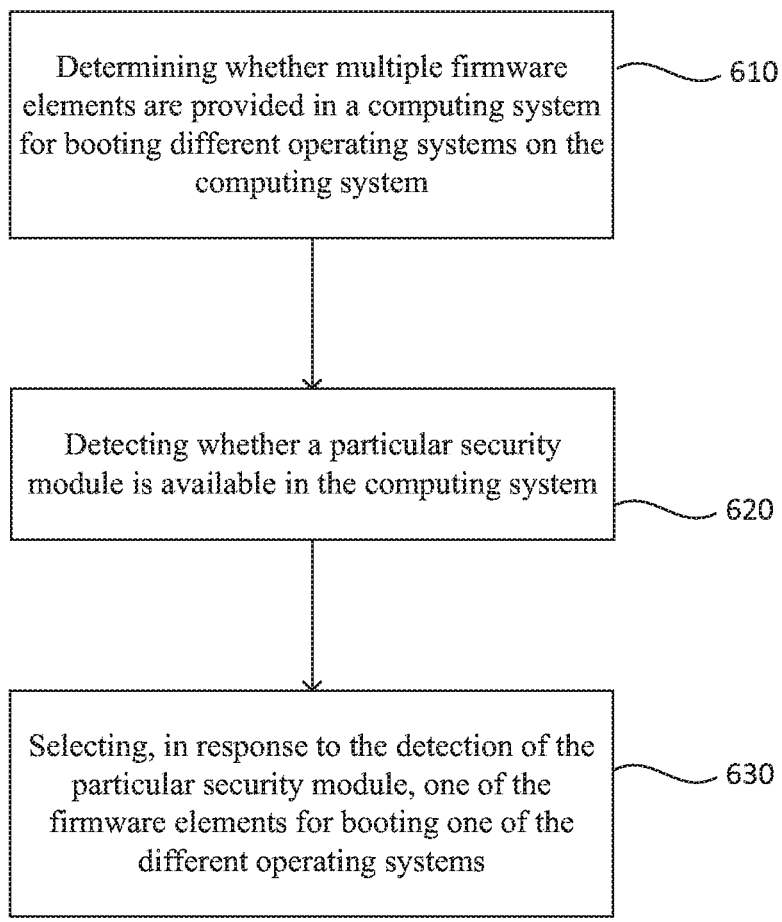
FIG. 6 is an example flow diagram illustrating an example method in accordance with aspects of the disclosure.

The technology generally relates to a system that uses multiple firmware elements to securely boot different operating systems on the same hardware platform, such as a laptop, tablet computer, wearable device such as a smartwatch or other client device. In this regard, the system includes one or more processors configured to boot the operating systems. A first memory device and a second memory device are connected to the processor(s). The memory devices may be configured to provide separate boot paths. For example, the first memory device may store a first firmware element for booting a first operating system, while the second memory device may store a second firmware element for booting a second operating system. To provide secure booting of each operating system, one or more security modules may be connected to the processor(s). For example, a first security module may be configured to provide authentication for booting the first operating system, while a second security module may be configured to provide authentication for booting the second operating system.

The system may be configured to select an intended operating system based on a number of factors. For example, the system may be configured such that, when the first security module is connected to the processor(s), either the first operating system or the second operating system is selected in response to a selection signal, but when the first security module is not connected to the processor(s), the second operating system is selected. This way, it is ensured that the system does not boot the first operating system when the first security module is not available to provide authentication.

For another example, the system may be configured such that, when both the first and the second security modules are available to provide authentication, one of the operating systems is selected based on a selection signal. The security modules are then selectively enabled and/or disabled based on that selection signal. This way, the system may be easily set and reset to either boot path.

For yet another example, the system may be configured such that, when only one of the first and second security modules is available to provide authentication, the system selects the operating system that the available security module can authenticate. This way, it is ensured that the system boots the operating system that is able to be authenticated.

For easy and secure assembly during manufacturing of the system, a given security module may be mounted on a removable component of the system. The removable component may have features readily identifiable with an intended operating system. By identifying these features, a technician may easily mount a security module that can authenticate the intended operating system on the removable component. Further, during manufacturing and assembly, the technician may easily set the intended operating system by connecting the removable component having the features identifiable with the intended operating system.

In summary, the technical problem is that booting different operating systems on a specific hardware platform may present security issues. The technology disclosed herein provides various solutions that enable boot paths to be securely selected based on the security module(s) available to authenticate the operating system. Thus, the technology is advantageous because it provides a secure way to boot multiple operating systems on one hardware platform. By removably connecting a security module or selectively enabling a security module based on selection signals, the technology ensures secure booting of an intended operating system. Further, mounting the security module to a removable component enables easy and secure assembly during manufacturing of the hardware platform.

Example Systems

FIG. 1A shows an example system 100A according to aspects of the disclosure. Processor(s) 110 of a computing device (not shown) is operatively connected to two memory devices, shown as a first memory device 122 and a second memory device 124. The processor(s) 110 can be any conventional processors, such as a commercially available central processing unit ("CPU"). Alternatively, the processor(s) can be an embedded controller of a computing device, such as a Platform Controller Hub ("PCH," which is a set of chips that controls data paths and support functions used in conjunction with a CPU, including for example clocking, media interfaces, I/O functions, etc.), a System on a Chip ("SOC"), etc. As other alternatives, the processor(s) 110 can be dedicated components such as an application specific integrated circuit ("ASIC") or other hardware-based processor. Although not necessary, the computing device (not shown) may further include specialized hardware components to perform specific computing processes, such as decoding video, matching video frames with images, distorting videos, encoding distorted videos, etc. The processor(s) are configured to boot a plurality of operating systems.

The first memory device 122 and the second memory device 124 are configured to store information accessible by the processor(s) 110, including instructions that can be executed by the processor(s) 110. The first memory device 122 and the second memory device 124 can also include data that can be retrieved, manipulated or stored by the processor(s) 110. The first memory device 122 and the second memory device 124 can be of any non-transitory type capable of storing information accessible by the processor(s) 110, such as a hard-drive, memory card, ROM, RAM, DVD, CD-ROM, flash memory device, write-capable, and read-only memories. By way of example, for flash memory devices any of a number of interfaces may be used, for example, Serial Peripheral Interfaces ("SPIs"), Low Pin Count ("LPC"), Multiplexed Address-Data ("MuxedAD"), etc.

The instructions can be any set of instructions to be executed directly, such as machine code, or indirectly, such as scripts, by the processor(s) 110. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data may be retrieved, stored or modified by the processor(s) 110 in accordance with the instructions. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The first memory device 122 and the second memory device 124 may each store a different firmware element. The firmware element stored by each memory device may be any type of firmware, such as coreboot (lightweight firmware that performs hardware initialization and executes additional boot logic called payloads), Universal Extensible Firmware Interface ("UEFI"), Basic Input/Output System ("BIOS"), Real Time Operating System ("RTOS"), etc. For instance, the first memory device 122 may store a first firmware element for booting a first operating system, for example coreboot for booting the first operating system, while the second memory device 124 may store a second firmware element for booting a second operating system, for example UEFI for booting the second operating system. Because the first memory device 122 and the second memory device 124 are separately connected to the processor(s) 110 as shown, two separate boot paths—each using a different firmware element—are created for the processor(s) 110.

The processor(s) 110 are operatively connected to different security modules, such as a first security module 132 and a second security module 134. The first security module 132 and the second security module 134 may be any type of security modules, for example, Trusted Platform Modules ("TPMs"), smartcards, security chips, etc. Certain types of security modules, for example TPMs, are designed to ensure that a particular operating system can safely run on specific hardware, such as processor(s) 110. In this example, the first security module 132 provides authentication for booting the first operating system that the first firmware element stored on the first memory device 122 is configured to boot, while the second security module 134 provides authentication for booting the second operating system that the second firmware element stored on the second memory device 124 is configured to boot.

In this scenario, the first security module 132 is mounted on a first removable component 140. The first removable component 140 is removably and operatively connected to the processor(s) 110. The first removable component 140 may be a peripheral component, such as a keyboard module, a hard drive, a graphics card, a monitor, etc. Alternatively, the first removable component 140 may be a circuit board that is separate from one or more other circuit boards on which the processor(s) 110, the first memory device 122, the second memory device 124, and the second security module 134 are mounted.

The first removable component 140 may have one or more features identifiable with a particular operating system. This way, during manufacturing of a computing device, a technician may place a security module corresponding to the operating system intended for the computing device simply by identifying that the first removable component 140 corresponds to the intended operating system. In this example, the first removable component 140 has at least one feature identifiable with the first operating system that the first firmware element stored on the first memory device 122 is configured to boot. For example, the identifiable feature may be a logo, a color scheme, a keyboard arrangement, etc.

The example system 100A may be configured such that, when the first security module 132 is operatively connected to the processor(s) 110, the processor(s) 110 are configured to select either the first operating system or the second operating system to boot in response to a selection signal. In this regard, a selector circuit 150 as shown is operatively connected to the processor(s) 110, the first memory device 122, and the second memory device 124. The selector circuit 150 may include any of a number of circuit elements, for example, multiplexers, switches, logic gates, etc. The selector circuit 150 is configured to select one of the boot paths provided by the first memory device 122 and the second memory device 124 based on a selection signal.

For example, the selector circuit 150 may be configured such that, when the first removable component 140 is operatively connected to provide the selection signal to the selector circuit 150 (indicating that the first security module 132 is operatively connected to the processor(s) 110), this causes the selector circuit 150 to operatively connect the first memory device 122 to the processor(s) 110. This way, during manufacturing of a computing device, the boot path provided by the first memory device 122 may be selected by the technician merely by operatively connecting the first removable component 140, which has features identifiable with the first operating system, to the selector circuit 150.

In contrast, the selector circuit 150 may be further configured such that, when the first removable component 140 is not operatively connected to provide the selection signal to the selector circuit 150 (indicating that the first security module 132 is not operatively connected to the processor(s) 110), this causes the selector circuit 150 to operatively connect the second memory device 124 to the processor(s) 110. This ensures that the processor(s) 110 does not run the first operating system when the first security module 132 is not operatively connected to the processor(s) 110.

The processor(s) 110, the first memory device 122, the second memory device 124, second security module 134, and the selector circuit 150 may be mounted on the same circuit board, or mounted on different circuit boards. For example, a vendor who manufactures hardware specifically designed for the second operating system may manufacture a motherboard that includes the processor(s) 110, the first memory device 122, the second memory device 124, the second security module 134, and the selector circuit 150. Thus, the processor(s) 110 on the motherboard is provided with two boot paths stored separately on the first memory device 122 and the second memory device 124. Here, the vendor may only be able to provide the second security module 134 on the motherboard because it does not manufacture specific hardware for other operating systems, such as the first operating system. However, another vendor that manufactures hardware specifically designed for the first operating system may take this motherboard and connect the first removable component 140 that includes the first security module 132 to this motherboard. This way, hardware specifically manufactured by the vendor to safely run one operating system is easily customized by the other vendor to safely run another operating system. A technician may perform this customization simply by connecting the removable component having the identifiable features corresponding to the intended operating system.

FIG. 1B shows an example system 100B according to further aspects of the disclosure. Example system 100B includes many of the features of example system 100A, but with certain differences as discussed further below. In FIG. 1B, a second removable component 142 is removably and operatively connected to the processor(s) 110. The second removable component 142 in this example has one or more features identifiable with the second operating system that the second firmware element stored on the second memory device 124 is configured to boot. For example, the identifiable feature may be a logo, a color scheme, a keyboard arrangement, etc. In this example, the selector circuit 150 is configured such that, when the second removable component 142 is operatively connected to provide the selection signal to the selector circuit 150, this causes the selector circuit 150 to operatively connect the second memory device 124 to the processor(s) 110. In contrast to the example system 100A of FIG. 1A, the second removable component 142 of example system 100B does not have any security module mounted thereon.

Likewise for the example system 100B, the processor(s) 110, the first memory device 122, the second memory device 124, second security module 134, and the selector circuit 150 may be mounted on the same circuit board, or mounted on different circuit boards. Similar to the example in FIG. 1A, a vendor that manufactures hardware specifically designed for the second operating system may manufacture a motherboard that includes the processor(s) 110, the first memory device 122, the second memory device 124, the second security module 134, and the selector circuit 150. In the example system 100B, the intended operating system is the second operating system, so the vendor simply connects the second removable component 142, which has features identifiable with the second operating system, to the selector circuit 150. Because the motherboard manufactured by the vendor already includes the second security module 134 for authenticating the second operating system, there is no need to include another security module in the second removable component 142.

FIGS. 2A and 2B show example systems 200A and 200B according to aspects of the disclosure. Example systems 200A and 200B include many of the features of example systems 100A and 100B, but with differences as discussed further below. In FIG. 2A, the first security module 132 is mounted on a first keyboard module 144. The first keyboard module 144 is removably and operatively connected to the processor(s) 110. The first keyboard module 144 in this example has features identifiable with the first operating system that the first firmware element stored on the first memory device 122 is designed to boot. For instance, the first keyboard module 144 may have an arrangement or layout designed for a first type of computing device provided by a first manufacturer, which is different than the arrangement/layout designed for a another type of computing device provided by a second manufacturer. The arrangement/layout may be reflected by a first keyboard scan element 145, which is operatively connected to the first security module 132. This way, during manufacturing of a computing device, a technician may place a security module corresponding to the operating system intended for the computing device simply by identifying that a keyboard module corresponds to the intended operating system, which may be possible by a quick glance. A 2-1 multiplexer 152 is operatively connected to the processor(s) 110, the first memory device 122, and the second memory device 124. The 2-1 multiplexer 152 is configured such that, when the first keyboard module 144 is operatively connected to the 2-1 multiplexer 152, it provides a logic value of "0" (or "1") as a selection signal for the 2-1 multiplexer 152 and causes the 2-1 multiplexer 152 to operatively connect the first memory device 122 to the processor(s) 110.

Compare FIG. 2A to the example system 200B shown in FIG. 2B, where a second keyboard module 146 is removably and operatively connected to the processor(s) 110 instead of the first keyboard module 144. The second keyboard module 146 in this example has features identifiable with the second operating system that the second firmware element stored on the second memory device 124 is designed to boot. For example, the second keyboard module 146 may have an arrangement/layout designed for a selected type of computing device. The arrangement/layout may be reflected by a second keyboard scan element 147, which is operatively connected to the processor(s) 110. In this scenario, the second keyboard module 146 is not provided with a connection to provide the selection signal to the 2-1 multiplexer 152. Rather, a resistor or other selector element 153 is operatively connected to the 2-1 multiplexer 152. The selector element 153 may provide a logic value of "1" (or "0") as a selection signal that causes the 2-1 multiplexer 152 to operatively connect the second memory device 124 to the processor(s) 110. In contrast to FIG. 2A, the second keyboard module 146 of example system 200B does not have a security module mounted thereon.

Similar to example systems 100A and 100B discussed above, in example systems 200A and 200B, the processor(s) 110, the first memory device 122, the second memory device 124, the second security module 134, and the 2-1 multiplexer 152 may be mounted on the same circuit board, or mounted on different circuit boards. Example systems 200A and 200B are configured to allow an intended operating system to be easily chosen, and provided with the corresponding safety guarantee. As discussed above, the vendor that manufactures hardware specifically designed for the second operating system may manufacture a motherboard that includes the processor(s) 110, the first memory device 122, the second memory device 124, the second security module 134, and the 2-1 multiplexer 152. During manufacturing, if the intended operating system for the computing device is the first operating system, the technician may identify that the first keyboard module 144 has features identifiable with the first operating system, and operatively connect the first keyboard module 144 to the 2-1 multiplexer 152. If the intended operating system for the computing device is the second operating system, the technician may identify that the second keyboard module 146 has features identifiable with the second operating system, and not connect the second keyboard module 146 to the 2-1 multiplexer 152. Either way, the resulting computing device will have the processor(s) 110 running the intended operating system with the corresponding security module.

FIG. 3 shows an example system 300 according to aspects of the disclosure. Example system 300 includes many of the features of example system 100A but with differences as discussed further below. In example system 300, the processor(s) 110 is operatively connected to the first memory device 122 and the second memory device 124, as well as the first security module 132 and the second security module 134.

The example system 300 may be configured such that, when the first security module 132 is operatively connected to the processor(s) 110, the processor(s) 110 are configured to select either the first operating system or the second operating system to boot in response to a selection signal. In this regard, a selector circuit 154 is operatively connected to the processor(s) 110, the first memory device 122, the second memory device 124, and the first security module 132. The selector circuit 154 is configured to select one of the boot paths provided by the first memory device 122 and the second memory device 124 based on a selection signal. For example, the selection signal may be part of a signal that comes from an element such as a switch, a jumper, or another chip to choose between the different boot paths during manufacturing, installation or operation of the computing device. For another example, the selection signal may be part of a signal that comes from a technician or a user.

Further, the selector circuit 154 may be configured such that, when the selection signal causes the first memory device 122 to be chosen for providing the boot path for processor(s) 110, the selector circuit 154 enables the first security module 132. Enabling the first security module 132 may include, for example, turning power on so that the first security module 132 may provide authentication for booting the first operating system using the first firmware element stored on the first memory device 122. On the other hand, when the selection signal causes the second memory device 124 to be chosen for providing the boot path for processor(s) 110, the selector circuit 154 may be configured to disable the first security module 132. Disabling the first security module 132 may include, for example turning power off to that device so that the second security module 134 may provide authentication for booting the second operating system using the second firmware element stored on the second memory device 124. Alternatively or additionally (as shown), the selector circuit 154 may be operatively connected to the second security module 134, and may also be configured to enable or disable the second security module 134 based on the selection signal. Thus, based on the intended boot path, a corresponding security module may be automatically selected. While only two security modules are shown, this approach is extendable to three or more security modules to enable booting of various different operating systems.

In the example system 300, the processor(s) 110, the first memory device 122, the second memory device 124, first security module 132, second security module 134, and the selector circuit 154 may all be mounted on the same circuit board. This way, a technician during manufacturing or installation may simply change the selection signal of the selector circuit 154 to select the boot path for the intended operating system, and as a result of this selection, the security module corresponding to the intended operating system would also be selected.

FIG. 4 shows example system 400 according to aspects of the disclosure. Example system 400 includes many of the features of example system 100A but with differences as discussed further below. In example system 400, the processor(s) 110 is operatively connected to the first memory device 122, the second memory device 124, and selector circuit 156. As shown, a security module 130 is operatively connected to the processor(s) 110 and the selector circuit 156.

The selector circuit 156 is configured such that it selects the boot path based on the operating system that the security module 130 is configured to authenticate. For example, if the security module 130 operatively connected to the selector circuit 156 is configured to provide authentication for booting an operating system stored in the first memory device 122, then connecting the security module 130 provides a selection signal that causes the selector circuit 156 to operatively connect the first memory device 122 to the processor(s) 110. This process selects the first operating system to be booted by the first firmware element stored on the first memory device 122. For another example, if the security module 130 operatively connected to the selector circuit 156 is configured to provide authentication for booting an operating system stored in the second memory device 124, then connecting the security module 130 provides a selection signal that causes the selector circuit 156 to operatively connect the second memory device 124 to the processor(s) 110. This process selects the second operating system to be booted by the second firmware element stored on the second memory device 124.

In the example system 400, the processor(s) 110, the first memory device 122, the second memory device 124, the selector circuit 156, and the security module 132 may all be mounted on the same circuit board. This way, a technician during manufacturing or installation may simply connect the security module for the intended operating system to the selector circuit 156 and the processor(s) 110, and as a result of this connection, the corresponding boot path for the intended operating system would be selected. This also ensures that only the operating system having the corresponding security module is booted on the processor(s) 110.

Although each of the foregoing examples have two memory devices that provide two separate boot paths on the same hardware system, the features described with respect to the foregoing examples may readily be extended to any number of memory devices providing any number of separate boot paths on the same hardware system.

FIG. 5 shows an example system 500 according to aspects of the disclosure. FIG. 5 illustrates one example of how the features of example system 100A may be extended to more than two memory devices. As shown, the processor(s) 110 of example system 500 is operatively connected to a number of memory devices, such as the first memory device 122, the second memory device 124, up to an $N^{th}$ memory device 128, where N is a total number of memory devices in the example system 500. For example, the $N^{th}$ memory device 128 may store an $N^{th}$ firmware element for booting an $N^{th}$ operating system. The processor(s) 110 can be operatively connected to the second security module 134 and an $N^{th}$ security module 138. For example, the $N^{th}$ security module 138 may provide authentication for booting the $N^{th}$ operating system. The $N^{th}$ security module 138 is mounted on an $N^{th}$ removable component 148. For example, the $N^{th}$ removable component may have features identifiable with the $N^{th}$ operating system.

The example system 500 may be configured such that, when the $N^{th}$ security module 138 is operatively connected to the processor(s) 110, the processor(s) 110 is configured to select, in response to a selection signal, any of the operating systems that any of the firmware elements stored on any of the memory devices (including the first memory device 122, the second memory device 124, up to the $N^{th}$ memory device 128) is configured to boot. In this regard, a selector circuit 158 is operatively connected to the processor(s) 110 and each of the memory devices (including the first memory device 122, the second memory device 124, up to the $N^{th}$ memory device 128). The selector circuit 158 is configured to select one of the boot paths provided by the memory devices based on a selection signal.

For example, the selector circuit 158 may be configured such that, when the $N^{th}$ removable component 148 is operatively connected to provide the selection signal to the selector circuit 158 (indicating that the $N^{th}$ security module 138 is operatively connected to the processor(s) 110), this causes the selector circuit 158 to operatively connect the $N^{th}$ memory device 128 to the processor(s) 110. This way, during manufacturing, the boot path provided by any of the memory devices may be selected by the technician merely by connecting the removable component corresponding to the intended operating system to the selector circuit 158.

For another example, the selector circuit 158 may be further configured such that, when the $N^{th}$ removable component 148 is not operatively connected to provide the selection signal to the selector circuit 158 (indicating that the $N^{th}$ security module 138 is not operatively connected to the processor(s) 110), this causes the selector circuit 158 to operatively connect another memory device to the processor(s) 110. For example, the selector circuit 158 may be configured to operatively connect to the processor(s) 110 the memory device that that has a corresponding security module operatively connected to the processor(s) 110, in this case it would be the second memory device 124 (corresponding second security module 134 is operatively connected to the processor(s) 110). This ensures that the processor(s) 110 does not run the $N^{th}$ operating system when the $N^{th}$ security module 138 is not operatively connected to the processor(s) 110.

Although FIG. 5 illustrates extending the features of example system 100A to more than two memory devices, the features of any of the example systems 100B-400B may be similarly extended. For example, an N−1 multiplexer may be used for extending example systems 200A and 200B to having more than two memory devices. For another example, more than two memory devices and more than two security modules may be included in example system 300, and the selector circuit 154 may be modified to choose any of the memory devices and enable/disable one or more of the security modules based on a selection signal. For yet another example, more than two memory devices may be included in example system 400, and the selector circuit 156 may be modified to choose any of the memory devices based on a selection signal.

Still further, each of the foregoing examples may be extended without having more than two memory devices, since a given firmware element may be able to boot more than one operating systems. For example, the first operating system may be booted using the first firmware element stored on the first memory device 122, while the second operating system and a third operating system may be booted using the second firmware element stored on the second memory device 124, and the processor(s) 110 is configured to select the operating system to boot in response to a selection signal.

Example Methods

Further to the example systems described above, an example method is now described.

FIG. 6 provides an example flow diagram 600 for operating a system having multiple boot paths. For example, example systems 100A, 100B, 200A, 200B, 300, 400, and 500 may be operated according to the example flow diagram 600.

In block 610, it is determined whether multiple firmware elements are provided in a computing system for booting different operating systems on the computing system. For example, referring to FIGS. 1A, 1B, 2A, 2B, 3, and 4, it may be determined that the example system has multiple firmware elements, such as those stored in a first memory device 122 for booting a first operating system and a second memory device 124 for booting a second operating system. For another example, referring to FIG. 5, it may be determined that the example system 500 has multiple firmware elements stored in the first memory device 122, the second memory device 124, up to the $N^{th}$ memory device 128 for booting different operating systems.

In block 620, a particular security module is detected to be available in the computing system. For example, referring to FIGS. 1A, 2A, and 3, it may be determined that the example system has both the first security module 132 available for authenticating the first operating system and the second security module 134 available for authenticating the second operating system. For another example, referring to FIGS. 1B and 2B, it may be determined that the example system only has the second security module 134 available. For instance, the detection may be made based on a selection signal, which may be received from, for example, a first removable component 140 in FIG. 1A, a circuit element 153 in FIG. 2B, or a security module 130 in FIG. 4.

In block 630, one of the firmware elements is selected for booting one of the different operating systems in response to the detection of the particular security module. For example, referring to FIGS. 1A and 2A, the first memory device 122 may be selected in response to the detection of the first security module 132. For another example, referring to FIG. 4, either the first memory device 122 or the second memory device 124 may be selected based on a detection of which operating system the security module 130 is configured to authenticate. For yet another example, referring to FIG. 5, the $N^{th}$ memory device 128 may be selected in response to the detection of the $N^{th}$ security module 138.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computing system, comprising:
   one or more processors;
   a selector circuit operatively connected to the one or more processors;
   a first memory device operatively connected to the selector circuit, the first memory device storing a first firmware element for booting a first operating system when a selection signal causes the selector circuit to select the first memory device;
   a second memory device operatively connected to the selector circuit, the second memory device storing a second firmware element for booting a second operating system when the selection signal causes the selector circuit to select the second memory device;
   a first security module configured to be enabled or disabled by a first signal received from the selector circuit based on the selection signal to selectively provide authentication for booting the first operating system; and
   a second security module configured to be enabled or disabled by a second signal received from the selector circuit based on the selection signal to selectively provide authentication for booting the second operating system.

2. The system of claim 1, wherein the one or more processors comprise at least one of a central processing unit or an embedded controller.

3. The system of claim 1, wherein at least one of the first memory device or the second memory device is a serial peripheral interface (SPI).

4. The system of claim 1, wherein one of the first firmware element or the second firmware element is one of a coreboot firmware element, a Universal Extensible Firmware Interface (UEFI), or a Basic Input/Output System (BIOS).

5. The system of claim 1, wherein at least one of the first security module or the second security module is a Trusted Platform Module (TPM).

6. The system of claim 1, further comprising:
a removable peripheral component removably connected to the one or more processors and the selector circuit, wherein the first security module is mounted in the removable peripheral component.

7. The system of claim 6, wherein the removable peripheral component is a circuit board.

8. The system of claim 6, wherein the selection signal is generated by the removable peripheral component.

9. The system of claim 6, wherein the removable peripheral component includes one or more features identifiable with the first operating system.

10. The system of claim 6, wherein the removable peripheral component is a keyboard module.

11. The system of claim 10, wherein the keyboard module includes one or more features identifiable with the first operating system.

12. The system of claim 11, wherein the one or more identifiable features includes a layout of keys on the keyboard module.

13. A computing system, comprising:
one or more processors;
a selector circuit operatively connected to the one or more processors;
a first memory device operatively connected to the selector circuit, the first memory device storing a first firmware element for booting a first operating system;
a second memory device operatively connected to the selector circuit, the second memory device storing a second firmware element for booting a second operating system;
a removable peripheral component having a first security module mounted therein to provide authentication for booting the first operating system by providing a selection signal to the selector circuit when the first security module is operatively connected to the one or more processors; and
a second security module operatively connected to the one or more processors to provide authentication for booting the second operating system,
wherein the selector circuit is configured to select either the first operating system or the second operating system to boot in response to whether the removable peripheral component is operatively connected to the one or more processors.

14. The system of claim 13, wherein:
the selector circuit is configured to operatively connect the first memory device to the one or more processors when the removable peripheral component is operatively connected to the one or more processors, and
the selector circuit is configured to operatively connect the second memory device to the one or more processors when the removable peripheral component is not operatively connected to the one or more processors.

15. A method of selecting an operating system, the method comprising:
storing, in a first memory device, a first firmware element for booting a first operating system;
storing, in a second memory device, a second firmware element for booting a second operating system;
receiving, by a selector circuit, a selection signal;
first determining, by the selector circuit, whether to operatively connect the first memory device or the second memory device to one or more processors via the selector circuit based on the received selection signal;
operatively connecting the first memory device or the second memory device to the one or more processors via the selector circuit based on the first determining;
second determining, by the selector circuit, whether to enable or disable a first security module based on the received selection signal to selectively provide authentication for booting the first operating system;
third determining, by the selector circuit, whether to enable or disable a second security module based on the received selection signal to selectively provide authentication for booting the second operating system;
sending, by the selector circuit, a first signal to the first security module to enable or disable the first security module based on the second determining; and
sending, by the selector circuit, a second signal to the second security module to enable or disable the second security module based on the third determining.

16. The method of claim 15, further comprising:
operatively connecting a removable peripheral component including the first security module to the one or more processors; and
generating, by the first security module, the selection signal to cause the first memory device to be operatively connected to the one or more processors.

* * * * *